United States Patent
Horsnell

(10) Patent No.: US 12,236,091 B2
(45) Date of Patent: Feb. 25, 2025

(54) MONITORING MEMORY LOCATIONS TO IDENTIFY WHETHER DATA STORED AT THE MEMORY LOCATIONS HAS BEEN MODIFIED

(71) Applicant: Arm Limited, Cambridge (GB)

(72) Inventor: Matthew James Horsnell, Cambridge (GB)

(73) Assignee: Arm Limited, Cambridge (GB)

( * ) Notice: Subject to any disclaimer, the term of this patent is extended or adjusted under 35 U.S.C. 154(b) by 68 days.

(21) Appl. No.: 18/040,577

(22) PCT Filed: Aug. 5, 2021

(86) PCT No.: PCT/GB2021/052030
§ 371 (c)(1),
(2) Date: Feb. 3, 2023

(87) PCT Pub. No.: WO2022/034293
PCT Pub. Date: Feb. 17, 2022

(65) Prior Publication Data
US 2023/0280904 A1    Sep. 7, 2023

(30) Foreign Application Priority Data
Aug. 10, 2020   (GB) ..................... 2012403

(51) Int. Cl.
*G06F 12/0815*   (2016.01)
*G06F 3/06*   (2006.01)
*G06F 15/78*   (2006.01)

(52) U.S. Cl.
CPC ............ *G06F 3/061* (2013.01); *G06F 3/0653* (2013.01); *G06F 3/0673* (2013.01);
(Continued)

(58) Field of Classification Search
CPC ...... G06F 3/061; G06F 3/0653; G06F 3/0673; G06F 12/0815
See application file for complete search history.

(56) References Cited

U.S. PATENT DOCUMENTS 5,765,195 A   6/1998   McDonald
7,676,652 B2   3/2010   Francis
(Continued)

FOREIGN PATENT DOCUMENTS

CN    1752941    3/2006

OTHER PUBLICATIONS

GeeksForGeeks article that notes that registers are simple memory addresses (Year: 2018).*
(Continued)

*Primary Examiner* — Michael Krofcheck
*Assistant Examiner* — Janice M. Girouard
(74) *Attorney, Agent, or Firm* — NIXON & VANDERHYE P.C.

(57) ABSTRACT

An apparatus comprises address storage circuitry to store indications of a first set of memory locations of a shared memory; a capacity indicator to indicate whether a capacity of the address storage circuitry has been reached, and monitoring circuitry to monitor the first set of memory locations and a second set of memory locations of the shared memory, identified in further storage circuitry to identify whether data stored at either set of memory locations has been modified. The monitoring circuitry is responsive to determining that the data has been modified to generate an indication that the data has been modified, and processing circuitry receives the indication and executes a monitor-address instruction specifying an address of a new memory location in the shared memory to update the address storage (Continued)

circuitry or the further storage circuitry to indicate the new address, depending on the capacity indicator.

20 Claims, 9 Drawing Sheets

(52) U.S. Cl.
 CPC ...... *G06F 12/0815* (2013.01); *G06F 15/7807* (2013.01); *G06F 15/7821* (2013.01); *G06F 15/7839* (2013.01)

(56) References Cited

U.S. PATENT DOCUMENTS

| | | | |
|---|---|---|---|
| 8,938,587 B2 | 1/2015 | Blaner | |
| 9,361,233 B2 | 6/2016 | Wang | |
| 10,649,684 B2 | 5/2020 | Blake et al. | |
| 2007/0088916 A1 | 4/2007 | Jacobson et al. | |
| 2008/0209133 A1 | 8/2008 | Ozer et al. | |
| 2009/0043993 A1* | 2/2009 | Ford | G06F 11/364 |
| | | | 712/216 |
| 2011/0296421 A1 | 12/2011 | Gschwind et al. | |
| 2013/0097385 A1 | 4/2013 | Beckmann | |
| 2014/0129784 A1* | 5/2014 | Chapman | G06F 9/542 |
| | | | 711/E12.001 |
| 2014/0250312 A1 | 9/2014 | Reinhardt et al. | |
| 2014/0250442 A1 | 9/2014 | Reinhardt et al. | |
| 2015/0178199 A1 | 6/2015 | Wang et al. | |
| 2015/0378927 A1 | 12/2015 | Bradbury et al. | |
| 2017/0255557 A1* | 9/2017 | Robinson | G06F 12/0815 |
| 2017/0286301 A1 | 10/2017 | Chang | |
| 2018/0189162 A1* | 7/2018 | Heirman | G06F 1/3228 |
| 2018/0267741 A1* | 9/2018 | Blake | G06F 12/0815 |
| 2018/0349280 A1 | 12/2018 | Prasad et al. | |
| 2020/0176071 A1 | 6/2020 | Ng | |

OTHER PUBLICATIONS

Office Action for CN Application No. 201880018227.5 issued Sep. 26, 2023 and English translation, 37 pages.

International Search Report and Written Opinion of the International Searching Authority mailed Mar. 16, 2018 in PCT/GB2018/050198, 13 pages.

* cited by examiner

MONITORING MEMORY LOCATIONS TO IDENTIFY WHETHER DATA STORED AT THE MEMORY LOCATIONS HAS BEEN MODIFIED

The present technique relates to the field of data processing.

In some data processing systems, multiple processing elements (e.g. multiple processing units or multiple sets of processing circuitry) have access to shared structures via an interconnect. These shared structures might include a shared memory, and messages to be communicated between the processing elements could be communicated via the shared memory. For example, one processing element can write a message for reception by another processing element to a memory location in a dedicated region of the shared memory. The receiving processing element could then receive the message by accessing that memory location.

Viewed from a first example of the present technique, there is provided an apparatus comprising:
address storage circuitry to store indications of a first set of memory locations of a shared memory;
a capacity indicator to indicate whether a capacity of the address storage circuitry has been reached;
monitoring circuitry to monitor the first set of memory locations and a second set of memory locations of the shared memory, identified in further storage circuitry, to identify whether data stored at either set of memory locations has been modified, wherein the monitoring circuitry is responsive to determining that the data has been modified to generate an indication that the data has been modified; and
processing circuitry to receive the indication that the data has been modified and to execute a monitor-address instruction that specifies an address of a new memory location in the shared memory to:
   determine, based on the capacity indicator, whether the capacity of the address storage circuitry has been reached;
   in response to determining that the capacity of the address storage circuitry has not been reached, to update the address storage circuitry to indicate that the new memory location is to be monitored by the monitoring circuitry; and
   in response to determining that the capacity of the address storage circuitry has been reached, to update the further storage circuitry to indicate that the new memory location is to be monitored by the monitoring circuitry.

Viewed from a second example of the present technique, there is provided a method comprising:
storing indications of a first set of memory locations of a shared memory in address storage circuitry;
providing a capacity indicator to indicate whether a capacity of the address storage circuitry has been reached;
monitoring the first set of memory locations and a second set of memory locations of the shared memory, identified in further storage circuitry, to identify whether data stored at either set of memory locations has been modified;
in response to determining that the data has been modified, generating an indication that the data has been modified;
receiving the indication that the data has been modified at processing circuitry; and executing a monitor-address instruction that specifies an address of a new memory location in the shared memory to:
   determine, based on the capacity indicator, whether the capacity of the address storage circuitry has been reached;
   in response to determining that the capacity of the address storage circuitry has not been reached, to update the address storage circuitry to indicate that the new memory location is to be monitored by the monitoring circuitry; and
   in response to determining that the capacity of the address storage circuitry has been reached, to update the further storage circuitry to indicate that the new memory location is to be monitored.

Viewed from a third example of the present technique, there is provided a computer program to control a host data processing apparatus to provide an instruction execution environment for execution of target code, the computer program comprising:
address storage program logic to maintain an address storage structure in a memory or in registers of the host data processing apparatus to store indications of a first set of memory locations of a shared memory;
capacity indicating program logic to maintain a capacity indicator in the memory or the registers to indicate whether a capacity of the address storage structure has been reached;
monitoring program logic to monitor the first set of memory locations and a second set of memory locations of the shared memory, identified in a further storage structure maintained in the memory or the registers, to identify whether data stored at either set of memory locations has been modified, wherein the monitoring program logic is responsive to determining that the data has been modified to generate an indication that the data has been modified; and
instruction decoding program logic to decode instructions of the target code to control the host data processing apparatus to perform data processing;
wherein the instruction decoding program logic is responsive to a monitor-address instruction that specifies an address of a new memory location in the shared memory to:
   determine, based on the capacity indicator, whether the capacity of the address storage structure has been reached;
   in response to determining that the capacity of the address storage structure has not been reached, to update the address storage structure to indicate that the new memory location is to be monitored by the monitoring logic; and
   in response to determining that the capacity of the address structure circuitry has been reached, to update the further storage structure to indicate that the new memory location is to be monitored by the monitoring logic.

Viewed from a fourth example of the present technique, there is provided an apparatus comprising:
   means for storing indications of a first set of memory locations of a shared memory;
   means for indicating whether a capacity of the means for storing indications of the first set of memory locations has been reached;
   means for monitoring the first set of memory locations and a second set of memory locations of the shared memory, identified in further means for storing, to identify whether data stored at either set of memory locations has been modified;
   means for generating an indication that the data has been modified in response to determining that the data has been modified;
   means for receiving the indication that the data has been modified; and
   means for executing a monitor-address instruction that specifies an address of a new memory location in the shared memory to:
      determine, based on the capacity indicator, whether the capacity of the means for storing indications of the first set of memory locations has been reached;

in response to determining that the capacity of the means for storing indications of the first set of memory locations has not been reached, to update the means for storing indications of the first set of memory locations to indicate that the new memory location is to be monitored by the means for monitoring; and in response to determining that the capacity of the means for storing indications of the first set of memory locations has been reached, to update the further means for storing to indicate that the new memory location is to be monitored by the means for monitoring.

Further aspects, features and advantages of the present technique will be apparent from the following description of examples, which is to be read in conjunction with the accompanying drawings, in which:

FIG. 1 schematically illustrates a system in which multiple processing elements have access to a shared memory via an interconnect;

Figure 1:
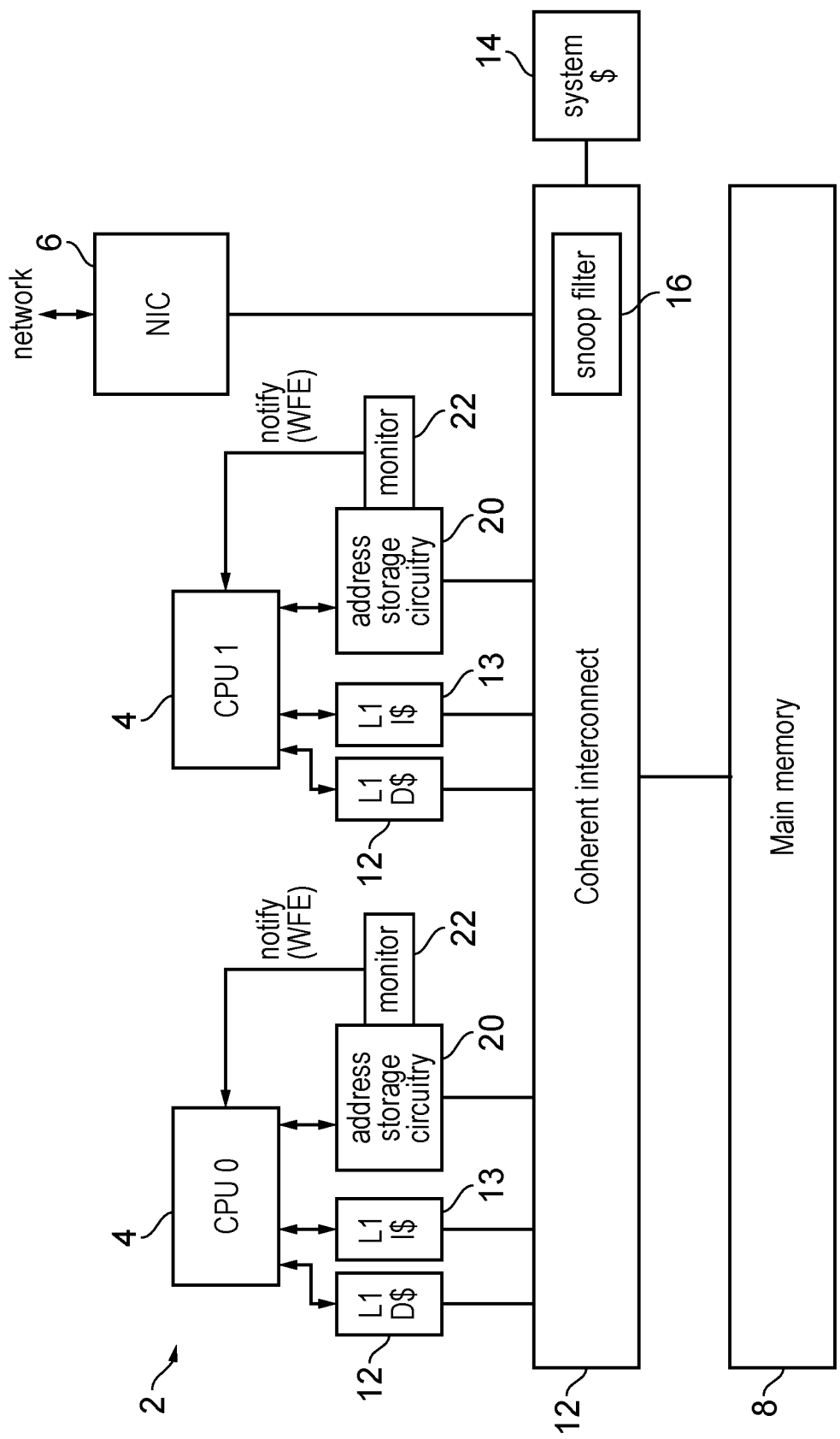

Before discussing the embodiments with reference to the accompanying figures, the following description of example embodiments and associated advantages is provided.

When writing a message to a memory location in shared memory, an approach to notifying a receiving processing element of a message transmitted by a transmitting processing element is to transmit an interrupt request to the receiving processing element. In this approach, the receiving processing element is responsive to the interrupt request to stop executing a current process and switch to executing an interrupt service routine, which includes an instruction to access the memory location in the shared memory to read the message written by the transmitting processing element. However, there can be a significant performance cost associated with this approach, particularly if the receiving processing element is executing instructions at the time the interrupt request is received, due to triggering the processing element to stop executing the current process. In addition, this approach places a constraint on the transmitting processing element—if the transmitting processing element is not arranged to transmit an interrupt request in response to writing a message to the memory location, the receiving processing element will not become aware of, and thus will not read, the message.

Another approach is for the receiving processing element to regularly poll locations in the shared memory where messages are expected to be written, to determine whether the data at those locations has been modified. This avoids the need for the transmitting processing element to trigger an interrupt, but consumes a significant amount of energy. It also requires the receiving processing element to remain in a powered-on state even when there are no instructions for the processing circuitry to execute, further increasing the energy consumption of the data processing system.

The present technique aims to provide a more efficient approach to monitoring locations in shared memory, without incurring the performance costs associated with triggering an interrupt when a message is written to the shared memory.

In accordance with one example configuration there is provided address storage circuitry to store indications of a first set of memory locations of a shared memory. The address storage circuitry is arranged to store, for example, the addresses of the first set of memory locations, which identify the first set of memory locations. The memory locations in the first set of memory locations are monitored by dedicated monitoring circuitry (e.g. separate to the processing circuitry) to identify any modifications to the data stored at those locations. Providing separate monitoring circuitry to monitor the first set of memory locations enables the processing circuitry to focus its resources on executing other processes. If there are no other processes for the processing circuitry to perform, the provision of separate monitoring circuitry allows the processing circuitry to enter a low power mode, reducing its energy consumption.

However, the inventors realised that an issue arises if the number of memory locations to be monitored by the monitoring circuitry exceeds the capacity of the address storage circuitry.

One approach to dealing with this situation could be to default to a system of processing circuitry monitoring the memory locations by regularly polling those memory locations. The processing circuitry typically has access to more resources than the monitoring circuitry, enabling it to monitor a much larger number of memory locations. However—as discussed above—this approach consumes a significant amount of energy.

An alternative approach could be to monitor some memory locations using the monitoring circuitry and the address storage circuitry, while the processing circuitry monitors other memory locations by polling those locations. However, this still requires the processing circuitry to remain in a powered-on state even while not executing instructions, and thus still consumes a significant amount of energy.

The present technique provides a more energy efficient approach to monitoring memory locations. In particular, a second set of memory locations is identified in further storage circuitry, and the monitoring circuitry monitors both the first set of memory locations and the second set of memory locations to identify whether data stored at either set of memory locations has been modified. The monitoring circuitry is then responsive to determining that the data has been modified to generate an indication that the data has been modified, and processing circuitry is provided to receive the indication.

A capacity indicator is provided to indicate whether a capacity of the address storage structure has been reached. For example, the capacity indicator could be a circuit (e.g. a circuit that detects whether a specific entry of a table has a particular value (e.g. via an AND gate)), or could be an entry in a table or storage structure. The processing circuitry is responsive to a monitor-address instruction specifying a new memory location to be monitored by the monitoring circuitry to determine, based on the capacity indicator, whether the capacity of the address storage circuitry has been reached. When it is determined that the capacity of the address storage circuitry has not been reached, the processing circuitry updates the address storage circuitry to indicate that the new memory location is to be monitored by the monitoring circuitry (e.g. adds the new memory location to the first set of memory locations, by storing an indication of the new memory location in the address storage circuitry). When it is determined that the capacity of the address storage circuitry has been reached, the processing circuitry instead updates the further storage circuitry to indicate that the new memory location is to be monitored by the monitoring circuitry (e.g. adds the new memory location to the second set of memory locations).

Using a capacity indicator to indicate when the capacity of the address storage circuitry has been reached allows a second set of memory locations to be identified in further storage circuitry. This, in turn, allows the number of memory locations which can be monitored by the monitoring circuitry to be increased, which leads to a significant power saving by reducing the likelihood of the processing circuitry needing to monitor memory locations itself. The increase in circuit area needed to implement this technique can be limited, especially if an existing storage structure is used to implement the further storage circuitry (although this is not required—the further storage circuitry can be an additional storage structure added to the apparatus), since the addition of a capacity indicator adds limited cost in terms of circuit area. Therefore, significant power savings can be achieved with a limited increase in costs associated with circuit area.

In some examples, the address storage circuitry comprises a plurality of entries, each configured to store one of the indications of the first set of memory locations, and the capacity indicator is configured to indicate that the capacity of the address storage circuitry has been reached unless the plurality of entries comprises at least one available entry for storing an indication of the new memory location.

For example, the capacity of the address storage circuitry is considered to be reached when there are no available entries in the address storage circuitry for storing an indication of a new memory location.

In some examples, the capacity indicator indicates whether the capacity of the address storage circuitry has been reached based on a value stored in the address storage circuitry.

For example, when the address storage circuitry comprises a plurality of entries, one of the entries is used to indicate whether the capacity of the address storage circuitry has been met, by storing a particular value (e.g. a single bit—a 1 or a 0) dependent on whether the capacity of the storage circuitry has been reached. Using an entry in the address storage circuitry to implement the capacity indicator allows the present technique—in particular the capacity indicator—to be implemented with a small increase in the size of the address storage circuitry (e.g. by a single entry, or even by as little as a single bit if the capacity is indicated by a 1 or a 0). This allows the overall capacity for monitoring addresses to be increased by a significant amount, with a limited increase in circuit area (e.g. the number of memory locations which the monitoring circuitry is capable of monitoring is increased by several (e.g. more than one) memory locations, with a limited increase in the size of the address storage circuitry).

In some examples, the monitoring circuitry is configured to identify that the data has been modified in response to receiving a snoop request identifying a memory location in the first set or the second set.

In these examples, a snoop request can be used as an indication that data in shared memory has been modified, and that corresponding entries in any caches controlled by the processing circuitry should be updated or invalidated, in order to maintain cache coherency. Making use of an existing cache coherency system (e.g. snoop requests) allows the present technique to be easily implemented in a typical system.

In some examples, the further storage circuitry is configured to store the indications of the second set of memory locations in a different format to the indications of the first set of memory locations stored in the address storage circuitry.

For example, the further storage circuitry is neither a separate address storage circuit having the same form as the address storage circuitry, nor additional entries added to the address storage circuitry, but is instead an additional, different, storage circuit which stores indications of the second set of memory locations in a different format to the indications of the first set of memory locations indicated in the address storage circuitry. The different format is a different arrangement of bits used to indicate each memory location—for example, one format could be storing a full memory address, while another format could be indicating the memory address with a flag set in a cache, while yet another format could include merging the memory address into a Bloom filter. By storing the second set of memory locations in a different format the first set of memory locations, these examples provide flexibility to store the indications of the second set of memory locations in a more space efficient manner, and/or in a way that makes use of existing structures in the processing system.

In some examples, the further storage circuitry comprises a cache.

The cache in these examples is a general purpose cache in the processing system, such as a data cache, rather than being a dedicated cache for identifying the second set of memory locations. Examples of a general purpose cache include a data cache storing indications of memory locations in the shared memory and copies of data retrieved from those locations. This approach of using a cache to represent the second set of memory locations allows an existing storage structure (e.g. a general purpose cache such as a data cache) in the processing system to be used as the further storage circuitry. Thus, the present technique can be implemented with a limited increase in circuit area.

In some examples, the cache comprises a plurality of entries indicating the second set of memory locations, wherein each of the entries is associated with a tag, and, during execution of the monitor-address instruction, the processing circuitry is configured to update the cache to indicate that the new memory location is to be monitored by setting the tag associated with a new entry indicating the new memory location to a predetermined value.

For example, the tag is a field associated with each entry—e.g. a field storing a single bit set to a particular value (e.g. 1 or 0) depending on whether its associated memory location is in the second set of memory locations. This approach allows the second set of memory locations to be identified using an existing cache with limited alteration (e.g. adding a single field (in some examples a single bit) to each entry), making the present technique easy to implement in a typical processing system and requiring a limited increase in circuit area.

In some examples, the tag is stored in a transactional memory field configured to indicate whether a cached memory location associated with the tag has been accessed by the processing circuitry during execution of a current transaction or will be accessed by the processing circuitry upon completion of execution of the current transaction.

For example, a transaction is a group of instructions executed atomically by the processing circuitry. To maintain the atomicity of the transaction, the processing circuitry maintains a record of addresses read by instructions in the transaction (a read set of addresses) and/or addresses to which the processing circuitry will write data once the transaction completes (a write set of addresses); this allows the processing circuitry to monitor whether the memory locations accessed in response to the transaction are accessed by other processes before the transaction completes, which would prevent the instructions in the transaction from being executed atomically. In a cache with a transactional memory field, the read set and/or the write set are identified in the transactional memory field (e.g. by setting a value stored in the transactional memory field to a particular value). In these examples of the present technique, all or part of the transactional memory field (e.g. a read set indicator, a write set indicator or both) is repurposed as a tag to indicate whether a cached memory location is in the second set of memory locations. This allows the second set of memory locations to be identified without increasing the size of the cache, thus allowing the present technique to be implemented with a limited increase in circuit area.

One might find it counter-intuitive to repurpose a transactional memory field in this way, since one would expect that the transactional memory field should be kept available for processing transactions. However, the inventor realised that in practice transactions are rare for some processors, so repurposing the transactional memory fields does not necessarily have a significant impact on the performance of the system. In particular examples, when a transaction is executed, the processing circuitry clears the transactional memory fields, and defaults to monitoring the second set of memory locations by continuously polling the shared memory.

In some examples, the monitoring circuitry is responsive to a snoop request identifying a given memory location to identify that the data has been modified based on whether the given memory location is indicated in the address storage circuitry as being in the first set of memory locations or tagged in the cache as being in the second set of memory locations.

As noted above, making use of an existing cache coherency system (e.g. snoop requests), in this way allows the present technique to be easily implemented in typical processing systems. Checking whether a given memory location identified by a snoop request is part of the first set of memory locations involves checking the given memory location against the indications of memory locations in the first set stored in the address storage circuitry, for example by accessing the address storage circuitry and checking whether one of the indications sorted in the address storage circuitry matches an indication of the given address. Meanwhile, checking whether the given memory location is in the second set of memory locations involves identifying whether the given memory location is present in (e.g.) the cache and, if it is, determining whether the tag associated with that entry is set.

In some examples, the cache is a level one data cache.

This is an implementation detail, and it will be appreciated that in practice any cache could be used for this purpose. The level one data cache is the cache closest to the processing circuitry, so it is typically faster to access this cache than other caches further down the memory hierarchy. Thus, using the level one data cache as the further storage circuitry reduces the time taken to check whether a given memory location is part of the second set of memory locations, leading to an improvement in the performance of the system.

In some examples, the further storage circuitry comprises a register.

Since registers typically do not take up a large amount of space (a single register is typically configured to store a single operand), using a register as the further storage structure limits the circuit area required to implement the present technique. A particularly space-efficient approach is to make use of an existing register in the system. In some example situations (e.g. when the processing circuitry is in a low power state), the processing circuitry does not make use of all of the available registers, leaving at least one register available for identifying the second set of memory locations.

In some examples, the register is configured to store a Bloom filter identifying the second set of memory locations.

A Bloom filter is, for example, a probabilistic data structure against which indications memory locations can be tested to determine whether they are part of the second set of memory locations identified by the Bloom filter. Typically, testing a value against a Bloom filter can give rise to a false positive determination (e.g. an incorrect determination that a memory location is part of the second set), but not a false negative determination. A Bloom filter is a particularly space efficient format in which to identify a set of data values (e.g. a single register could be used to identify multiple memory locations), which allows the increase in circuit area required to implement these examples of the present technique to be limited. Indeed, the number of data values which could be identified by a Bloom filter stored in a single register is theoretically unlimited, although in practice in practice it is typical to limit the number of data values added to the Bloom filter because the likelihood of false positives occurring increases as the number of values in the Bloom filter increases. The time taken to determine whether a value is part of a set of values represented by the Bloom filter (e.g. the time taken to determine whether a memory location is part of the second set of memory locations) is constant regardless of how many values are represented; this means that there is also a time advantage associated with using a Bloom filter—the amount of processing time taken up checking whether a memory location is one of the second set of memory locations can thus be made deterministic, and in most cases will be reduced as compared to other techniques. Therefore, using a Bloom filter in this way also allows for the performance of the system to be improved.

In some examples, the Bloom filter comprises a bit array and, during execution of the monitor-address instruction, the processing circuitry is responsive to determining that the capacity of the address storage circuitry has been reached to: apply at least one hash function to an indication of the new memory location to identify a plurality of bit positions in the Bloom filter; and set each of the plurality of bit positions to a predetermined value.

The Bloom filter in such examples is an array (e.g. set, series) of 1s and 0s stored in the register, and each hash function maps an input value (e.g. an indication of the new memory location, such as an address or part of an address) to a single bit location (bit position) in the array or to a plurality of bit positions in the array, each of which is set to a predetermined value (e.g. 1 or 0) when the input value is added to the set. Thus, adding a new memory location to the second set of memory locations is a relatively simple operation, requiring only a small number of bits in a register to be updated. As noted above, this approach is also particularly space efficient, due to the fact that multiple memory locations can be identified using a single register.

In some examples, the monitoring circuitry is responsive to a snoop request identifying a given memory location to determine that the data has been modified in response to at least one of: determining that the first set of memory locations includes the given memory location when an indication of the given memory location matches an indication stored in the address storage circuitry; and determining that the second set of memory locations may include the given memory location based on testing the indication of the given memory location against the Bloom filter.

As discussed above, testing a memory location against the Bloom filter allows a determination to be made of whether the memory location is not or possibly is in the second set of memory locations—e.g. false positives are possible, but false negatives are not. However, false positives are not particularly problematic in these examples, because they do not affect the functional correctness of the system: although the performance of the system is slightly affected by a false positive—due to the processing circuitry unnecessarily accessing a memory location which has not actually been modified—this does not prevent the correct operation of the processing circuitry. Checking whether a given memory location identified by a snoop request is part of the first set of memory locations involves checking the given memory location against the indications of memory locations in the first set stored in the address storage circuitry, for example by accessing the address storage circuitry and checking whether one of the indications sorted in the address storage circuitry matches an indication of the given address. Checking whether the given memory location is potentially part of the second set of memory locations identified by the Bloom filter, involves testing the indication of the given memory location against the Bloom filter, for example by applying the same hashes to the indication of the given memory location that were used to add memory locations to the second set, and checking whether the bit positions identified by the hashes are set to a pre-determined value. Thus, the time taken to check whether the given memory location is potentially part of the second set (and the associated performance impact) is constant regardless of how many memory locations are included in the second set.

In some examples, the monitoring circuitry is separate from the processing circuitry.

For example, the monitoring circuitry is a separate structure in hardware from the processing circuitry. This allows the performance of the system to be improved, since the processing circuitry can focus on executing instructions rather than monitoring the first and second sets of memory locations. Alternatively, if the processing circuitry has no instructions to execute, having the monitoring circuitry as a separate piece of hardware allows the processing circuitry to enter a low-power mode, reducing its power consumption, while allowing the monitored addresses to continue to be monitored.

In some examples, the processing circuitry is responsive to a wait-for-event instruction to enter a low-power state until an event indication is received by the processing circuitry.

For example, the processing circuitry enters the low-power state (e.g. standby state, power-saving mode) without the monitoring circuitry entering a low-power state, which is possible due to the monitoring circuitry being separate from the processing circuitry. By allowing the processing circuitry to enter a low-power state while the monitoring circuitry continues to monitor the first and second sets of memory locations, the power consumption of the system can be reduced (for example, because the monitoring circuitry is dedicated circuitry for monitoring the first and second sets of addresses, meaning that its power consumption is likely to be lower than the power consumption of the processing circuitry, which is adapted to perform a wider range of operations).

In some examples, the event indication comprises the indication that the data has been modified.

For example, the processing circuitry is configured to exit the low-power state in response to receiving the indication that the data has been modified. This allows for a reduction in power consumption (by allowing the processing circuitry to enter a low-power state) while still allowing the processing circuitry to be notified of any modifications to data stored at the first and second sets of memory locations.

In some examples, the first and second sets of memory locations comprise memory locations to which other sets of processing circuitry can write messages to be read by the processing circuitry.

In a system comprising multiple processing units (e.g. multiple sets of processing circuitry, also referred to as processing elements) all having access to a shared memory, processing units are capable of sending messages to one another by writing the messages in particular regions of the shared memory. A receiving processing unit receives the message by accessing the relevant memory location. Therefore, it is beneficial for the processing circuitry to be notified whenever data at the particular regions is modified. Thus, in these examples, the first and second sets of memory locations are memory locations to which other processing elements are able to write messages to be read by the processing circuitry, and thus the provision of monitoring circuitry to monitor these memory locations allows the processing circuitry to be notified when a message is written to memory by another processing element.

In some examples, the first and second sets of memory locations each comprise non-contiguous memory locations.

The first and second sets of memory locations therefore contain one or more 'gaps' in the memory location addresses, meaning that those memory locations are identified separately (e.g. not part of a range).

In a particular example, if a memory region contains address locations A-B-C-D-E, then a first set of non-contiguous memory locations could be defined as {A, B, E}, or {B, D, E}, or {A, B, C, E} since all of these sets contain one or more gaps between the start address and the end address. Such a set could not include {A, B, C} or {D, E, F} because these contain no such gap. That is to say that first and second sets of memory locations cannot be completely defined using a single address range having a start point and an end point.

Since non-contiguous memory locations are identified independently, each new memory location to be monitored by the monitoring circuitry requires addition of new data to the address storage circuitry or the further storage circuitry (e.g. storing a new indication of the new memory location). The present technique allows the number of independently identified, non-contiguous (e.g. discontiguous, disjoint) memory locations that can be monitored by the monitoring circuitry to be increased.

In some examples, during execution of the monitor-address instruction, following updating the address storage circuitry to indicate that the new memory location is to be monitored by the monitoring circuitry, the processing circuitry is configured to check whether the capacity of the address storage circuitry has now been reached and, in response to determining that the capacity of the address storage circuitry has now been reached, the processing circuitry is configured to update the capacity indicator to indicate that the capacity of the address storage circuitry has been reached.

For example, each time a new memory location is added to the first set of memory locations, the processing circuitry checks whether the address storage circuitry has reached its capacity as a result, and sets the capacity indicator accordingly. This allows the accuracy of the capacity indicator to be maintained.

Particular embodiments will now be described with reference to the figures.

FIG. 1 schematically illustrates an example of a data processing system 2 in which the techniques described in this application can be used. The system 2 has a number of processing elements 4, 6 which share access to memory 8. In this example the processing elements include two central processing units (CPUs) 4 and a network interface controller (NIC) 6, but it will be appreciated this is just one example and many other types of processing element could be provided, e.g. a graphics processing unit (GPU), display controller, direct memory access (DMA) controller, peripheral input/output (I/O) controller, etc. The CPUs 4, 6 are examples of processing circuitry to receive the indication that the data has been modified and to execute a monitor-address instruction, and the main memory 8 is an example of shared memory. A coherent interconnect 10 is provided to manage coherency between the respective processing elements 4, 6 according to a coherency protocol. Some processing elements, such as the CPUs 4, have one or more caches 12, 13 for caching instructions or data from the memory system (e.g. from the main memory 8). While FIG. 1 illustrates each CPU 4 having a single level 1 data cache 12 and a single level 1 instruction cache 13 for conciseness, a given processing element can have multiple levels of caches (e.g. level 1 and level 2 caches). The apparatus also includes at least one system level cache 14, e.g. coupled to the interconnect 10, which is not assigned to a particular processing element but is located closer to the memory system. The system cache 14 can be used for speeding up accesses to the memory system by uncached processing elements such as a network interface controller 6 which do not have a cache themselves.

The interconnect 10 has a snoop filter 16 which tracks which caches hold data from particular addresses. The snoop filter 16 can be precise, or could use a more approximate representation (e.g. a filter representation) which permits some false positive detections that a given address is cached in a particular cache but does not permit false negatives (cases when data is cached but this is not detected by the filter). On detecting a read or write access from a given processing element to a given address, the coherent interconnect 10 looks up the snoop filter 16 for the corresponding address, and identifies any caches which could be holding the data, and if necessary transmits snoop requests to the corresponding caches to query the coherency state of the data held by those caches, return corresponding data values, and/or trigger invalidations. The coherency protocol defines what response is to be taken to a particular type of transaction when data is held in a cache in a particular coherency state. For example, when data is cached in a shared state indicating that coherency is to be maintained with corresponding data in other caches, then a write to the shared data by one processing element will trigger invalidations of the corresponding data in caches elsewhere in system to avoid other processing elements accessing potentially out of date information. Hence, the interconnect 10 can exchange various coherency protocol transactions (such as read, write or snoop transactions) with the respective caches or processing elements.

Some software processes running on one of the CPUs 4 will need to multiplex many communication streams received from other actors quickly and efficiently. These communication streams could for example come from other processing elements 4 updating shared memory, from an external source via the network interface controller 6 or a peripheral I/O device, or from another software process (e.g. another virtual machine) executing on the same processing element. For example, the other processing elements 4 can transmit messages to one of the CPUs by writing data to a particular region of the shared memory 8. To avoid the software process needing to poll a large number of memory locations continuously (e.g. to check for messages from other processing elements), each CPU 4 in FIG. 1 is provided with address storage circuitry 20 for storing monitoring data defining a first set of memory locations in the shared memory 8 to be monitored for changes, and monitoring circuitry 22 to monitor accesses to the memory system. When a change to data in one of the memory locations indicated in the address storage circuitry 20 is detected by the monitoring circuitry 22, the monitoring circuitry 22 sends an interrupt to the corresponding CPU 4 to notify the CPU 4 that data stored at one of the monitored addresses has changed, where the interrupt is an example of an indication that the data has been modified. The address storage circuitry 20 is an example of address storage circuitry to store indications of a first set of memory locations of a shared memory, and is capable of storing monitoring data independently defining a number of non-contiguous memory locations, so that multiple memory locations can be monitored for changes in parallel. The monitoring circuitry 22 is an example of monitoring circuitry to monitor the first set of memory locations and a second set of memory locations of the shared memory, identified in further storage circuitry, to identify whether data stored at either set of memory locations has been modified.

At the architectural level, the processing circuitry (CPU) 4 supports a number of instructions in the instruction set architecture which control setting and clearing of the monitoring data in the address storage circuitry 20, and reporting of which regions have changed. The instruction decoder of each processor 4 could, for example, detect the opcode of instructions fetched for processing, and when a monitor-address instruction (discussed below) is encountered, control the processing circuitry 4 to trigger updates of data in the address storage circuitry 20. The instruction decoder could also control the processing circuitry to request a report of which memory locations have changed from the monitoring circuitry 22.

Hence, the monitor-address instruction is provided to allow the CPU 4 to register memory locations to a CPU-local monitoring store (address storage circuitry) 20, so that a corresponding monitor circuit 22 can then watch for changes to those locations to occur while the CPU can enter a low power mode to wait to be notified of those changes and not miss any changes—this is possible because the monitoring circuitry 22 is separate from the CPU 4, so can continue to monitor memory locations while the CPU is in a low power mode.

Using a wait-for-event (WFE) instruction, the processor can be switched to a power saving state (e.g. low power or standby mode), and the processor 4 then waits for the monitor circuitry 22 to signal that a change has been detected. When the monitor circuitry 22 notifies the processor that an event has occurred, an indication (e.g. address) of the memory location at which the change has been detected is added to a buffer or log of addresses to be accessed by the processing circuitry.

As shown in FIG. 1, each processing element 4 which is capable of setting requests for monitoring of memory locations is provided with its own separate address storage circuitry 20 and monitor circuitry 22. This allows the address storage circuitry to be integrated into the coherency scheme managed by the coherent interconnect 10 so that entries in the address storage circuitry 20 are, in some examples, tagged with a coherency state according to the relevant coherency protocol so that they will be snooped in response to changes to the data in the corresponding addresses. Moreover, it is also possible that, as well as (or instead of) actively monitoring the memory locations, the monitoring circuitry 22 is arranged to intercept snoop requests transmitted by the coherent interconnect 12 to identify memory locations that have been modified.

The inventor realised that a problem might arise if a monitor-address instruction specifying new address to be monitored by the monitoring circuitry 22 is executed by the processing circuitry 4 when the capacity of the address storage circuitry 20 is reached. In this situation, the monitoring circuitry 22 will not be able to monitor the new memory location specified by the monitor address instruction without, for example, sacrificing one of the memory locations currently being monitored. Thus, the performance benefits provided by the monitoring circuitry 22 and address storage circuitry 20 are only provided until the capacity of the address storage circuitry 20 is exceeded.

To address this issue, one could increase the size of the address storage circuitry 20, or provide additional storage circuitry for storing address monitoring data. However, this comes at the cost of a significant increase in circuit area.

Instead, the present technique addresses this problem by identifying any additional memory locations to be monitored in a different format, in an existing storage structure such as a cache or in a register. As will be described in the examples below, the different format is a different arrangement of bits being used to identify the memory locations—for example, the first set of memory locations could be identified in the form of full memory addresses, while the second set of memory addresses could be identified in a Bloom filter, or as a tag set in a cache. The monitoring circuitry 22 thus monitors two sets of memory locations: a first set of memory locations identified by the address monitoring data stored in the address storage circuitry 20, and a second set of addresses identified in further storage circuitry. For example, the further storage circuitry can include a data cache 12, or a register. This approach allows for a significant increase in the number of memory locations that can be monitored by the monitoring circuitry 22, without a significant increase in circuit area.

Figure 2:
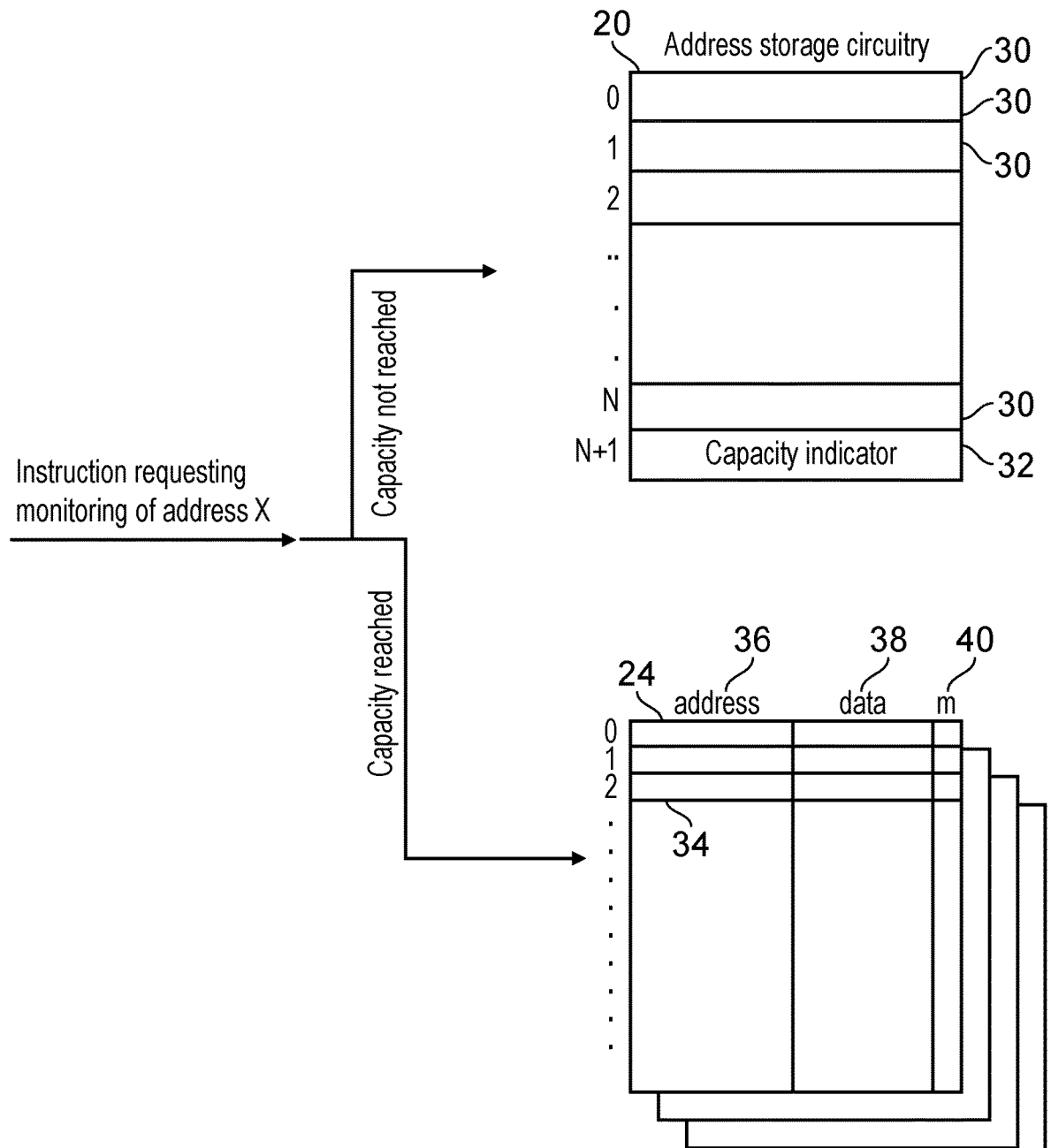
FIG. 2 illustrates an example of the address storage circuitry and the further storage circuitry of the present technique, in which the further storage circuitry comprises a cache.

The further storage circuitry can be implemented in any of a number of ways. For example, FIG. 2 schematically illustrates an example in which the further storage circuitry comprises a cache 24. For example, this could be the level 1 data cache 12 shown in FIG. 1, but it will be appreciated that other caches in the system could also be used.

As shown in FIG. 2, address storage circuitry 20 is provided to store indications of a first set of memory locations in the shared memory to be monitored by the monitoring circuitry 22. The indications can take any form, but in this example they are addresses.

The address storage circuitry 20 has a plurality of entries 30, each configured to store an address of a memory location in the first set of memory locations to be monitored by the monitoring circuitry. These addresses could be physical addresses which directly identify locations in the shared memory, or they could be virtual addresses which need to be translated into physical addresses (e.g. within a memory management unit (MMU)) before the corresponding memory location can be accessed.

The address storage circuitry 20 also includes a capacity indicator 32, which indicates whether the capacity of the address storage circuitry 20 has been reached. In this example, the capacity indicator 32 is a value stored in an additional entry (specifically the final entry) in the address storage circuitry 20, which is set to a predetermined value when the capacity is reached. For example, when the capacity of the address storage circuitry 20 is reached (e.g. each entry 30 stores a valid address to be monitored), the capacity indicator 32 could be set to 1, and when the capacity has not been reached, the capacity indicator 32 could be set to 0, or could be used to store an entry. It will be appreciated, however, that this is just one example of the values which could be used, and in practice any values could be used to indicate whether or not the capacity of the address storage circuitry 20 has been reached. The capacity indicator 32 is an example of a capacity indicator to indicate whether a capacity of the address storage circuitry has been reached.

FIG. 2 also shows a cache 24. The cache 24 comprises a plurality of entries 34, each including an address field 36 representing a memory location in the shared memory and a data field 38 storing a cached copy of the data stored at the corresponding memory location. It will be appreciated that the cache 24 need not necessarily store full addresses, but could instead store indications of the memory locations in another form. Although not shown, in some examples each cache entry 34 also includes one or more coherency fields indicating the coherency state of each entry 34. The cache 24 shown in the example of FIG. 2 is a set-associative cache comprising four ways in each set; however, this is just one example, and it will be appreciated that any type of cache can be used (e.g. fully associative or direct mapped or caches with other numbers of ways). Each entry 34 also includes a monitored field 40 (or monitored bit), which indicates whether the memory location identified by the address stored in the address field of that cache line is one of a second set of memory locations to be monitored by the monitoring circuitry. In some examples, the monitored field 40 stores a single bit, which is set to a first value (e.g. 0) to indicate that the memory location identified in a given entry is not part of the second set of memory locations, or to a second value (e.g. 1) to indicate that the memory location is part of the second set. The addition of a monitored field 40 in this way allows an existing cache 24 in the system (e.g. a level 1 data cache) to be adapted to indicate a second set of memory locations to be monitored by the monitoring circuitry, without a significant increase in circuit area—in this example, the size of the cache only needs to be expanded by a single bit for each entry.

The monitoring circuitry (not shown) is then configured to monitor both the first set of memory locations (identified by the addresses stored in the address storage circuitry 20) and the second set of memory locations (identified by the modified field 40 in the cache 24) for changes to the data stored at those memory locations.

When the processing circuitry (CPU 4) executes a monitor-address instruction identifying a new memory location to be monitored—in the example illustrated in FIG. 2, the new memory location is at "address X"—it first checks whether the capacity indicator 32 indicates that the capacity of the address storage circuitry 20 has been reached. If the capacity indicator 32 indicates that the capacity of the address storage circuitry 20 has not been reached (e.g. if the capacity indicator 32 is set to 0), the processing circuitry adds the new memory location to the first set of memory locations by storing the address (address X) in an available entry 30 of the address storage circuitry 20. On the other hand, if the capacity indicator 32 indicates that the capacity of the address storage circuitry 20 has been reached, the processing circuitry instead adds the new memory location to the second set of memory locations by locating the new memory location in the cache 24 and setting the corresponding monitored field 40 to a predetermined value (e.g. 1).

In this way, with only a small increase in circuit area (adding a single entry to the address storage circuitry 20 to provide the capacity indicator 32 and a single field 40 to each entry in the cache 24), the number of non-contiguous memory locations which can be monitored by the monitoring circuitry can be increased significantly.

Figure 3:
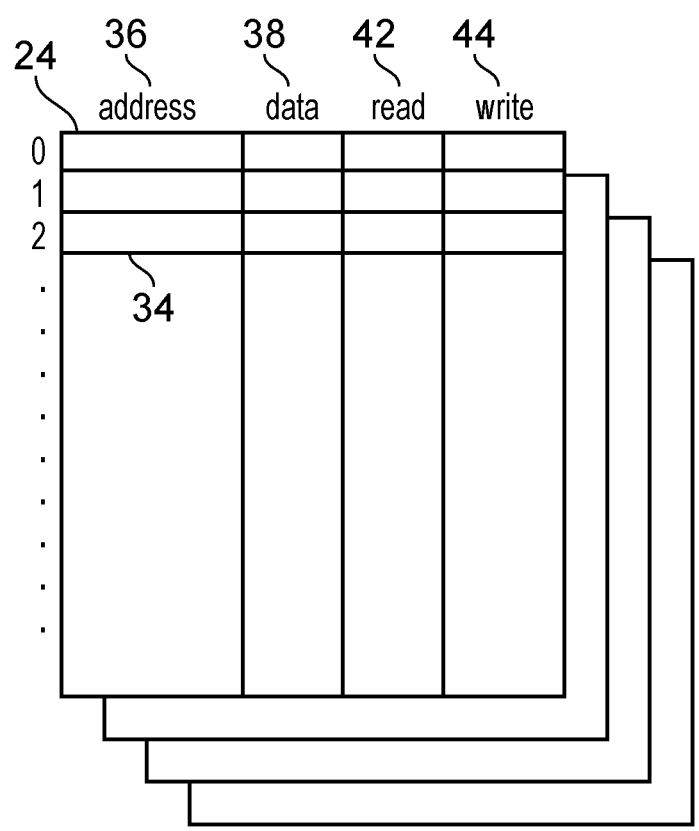
FIG. 3 illustrates an example of a cache comprising hardware transactional memory fields.

The increase in circuit area required to implement the present technique can be made even smaller by repurposing existing fields in the cache 24 to provide the monitored field 40. For example, FIG. 3 shows a cache 24 which includes one or more transactional memory fields 42, 44. These fields are used to track whether an address is part of a read set or a write set of addresses being tracked by the processing circuitry during execution of a transaction. A transaction is a block of instructions which are executed atomically by the processing circuitry, with any updates to memory (e.g. stores) only being committed at the end of the transaction if other instructions in the transaction execute successfully. Memory locations accessed by the processing circuitry during execution of the transaction are tracked to determine whether they have been accessed by another process during execution of the transaction. In this example, the processing circuitry tracks a read set of addresses, corresponding to memory locations which have been subject to a read access as part of a transaction, and a write set of addresses, corresponding to memory locations which will be written to upon completion of the transaction.

In some examples of the present technique, one or both of the transactional memory fields 42, 44 are repurposed for use as the monitored field, allowing the memory locations in the second set to be identified in the cache 12 without increasing the size of the cache.

One might consider it to be counter-intuitive to repurpose the transactional memory fields in this way, since one might expect that this would have a negative effect on the processing of transactions. However, transactions are rare in some situations, in which case the transactional memory fields 42 and 44 are often not in use. For example, when the processing circuitry is put into a low power state, the processing circuitry will not be processing transactions and thus will not make use of the transactional memory fields 42, 44. The fields can therefore be repurposed at this time, at little to no cost.

When the processing circuitry processes a transaction, the processing circuitry could clear all of the transactional memory fields and default to monitoring the memory locations in the second set by continuously polling the shared memory. Alternatively, if only one of the transactional memory fields 42, 44 is used to indicate the memory locations in the second set, the processing circuitry can process the transaction using the other transactional memory field. For example, it is often more important to monitor the read set of addresses than the write set, since if a memory location in the read set is accessed during the transaction this indicates that the data read from that location during the transaction was potentially not up to date. Therefore, in some examples, the processing circuitry repurposes the write set field 44 to indicate the memory locations in the second set, and continues to process transactions using the read set field 42.

Figure 4:
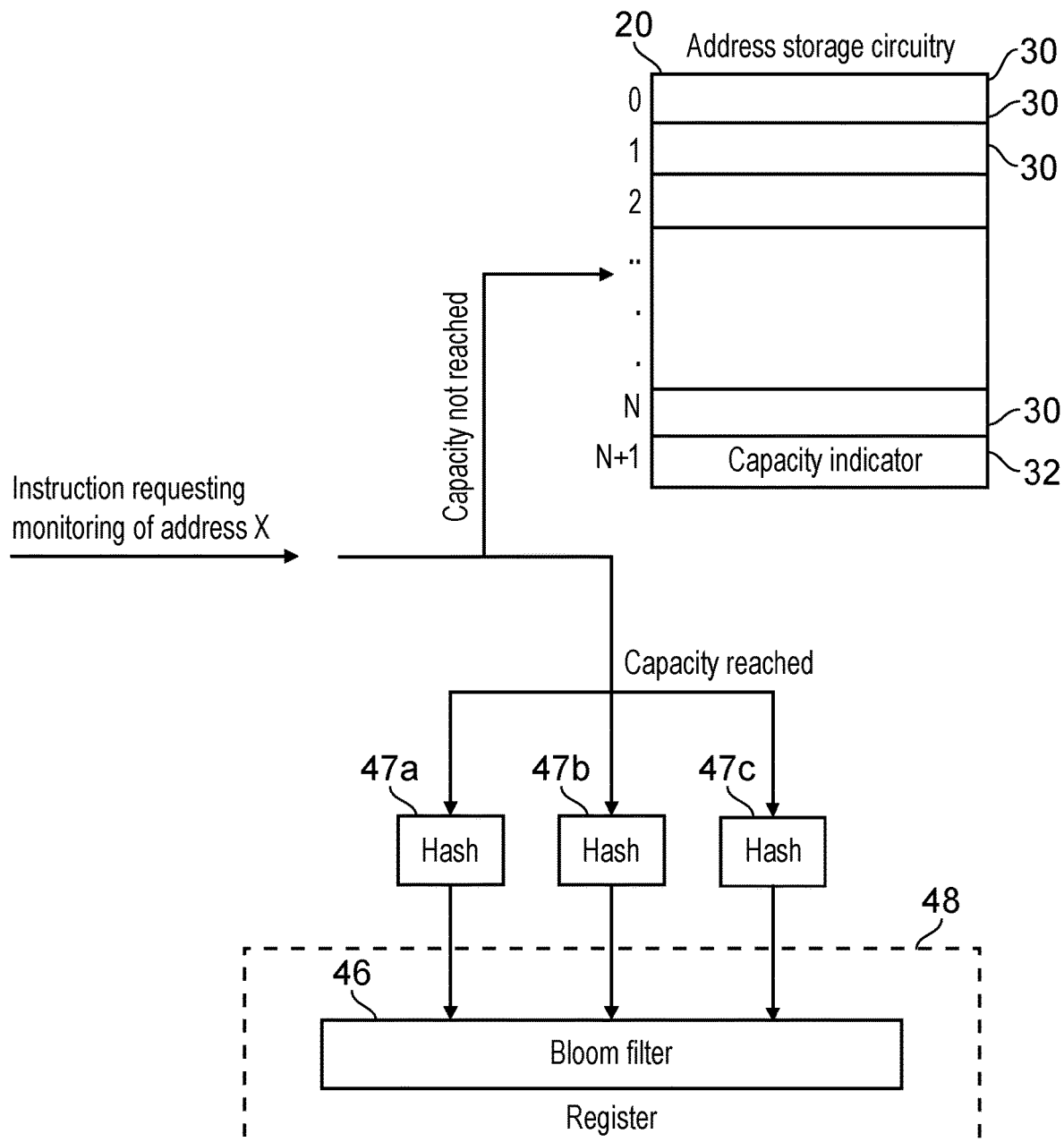
FIG. 4 illustrates an example of the address storage circuitry and the further storage circuitry of the present technique, in which the further storage circuitry comprises a register storing a Bloom filter.

Another example of how the further storage circuitry, identifying the second set of memory locations, can be implemented is using a register. FIG. 4 shows an example of the present technique in which the second set of memory locations are identified using a Bloom filter 46 stored in a register 48.

A Bloom filter is a probabilistic data structure which can be used to test whether an element (e.g. data value) is likely to be part of a set. Typically, false positives are possible, but false negatives are not—e.g. testing a value against a Bloom filter determines whether the value definitely is not in the set or potentially is in the set. In this example, the Bloom filter 46 is a bit array stored in a register 48. The processing circuitry adds data values to the set of values represented by the Bloom filter 46 by applying a plurality of different hash functions 47 to the data value, the results of which identify a set of bit positions in the bit array (e.g. each hash function 47 identifies one or more bit positions). The processing circuitry then sets each bit position identified by the hash functions to a set value (e.g. 1). To check whether a value is likely to be part of the set identified by the Bloom filter, the processing circuitry applies the same hash functions to the value and checks whether the bits identified by the hash functions are set to the predetermined value.

In the example shown in FIG. 4, when a monitor-address instruction identifying a given address (address X) is executed by the processing circuitry, if the capacity indicator 32 indicates that the capacity of the address storage circuitry 20 has been reached, the processing circuitry merges the address into the Bloom filter 46 stored in the register 48 (e.g. by applying the set of hash functions 47 to the address and setting the bits identified by the hash functions 47 to a predetermined value).

A Bloom filter is a space-efficient storage structure, capable of storing a large number of data values in a small amount of space. In this example, the second set of memory locations to be monitored by the monitoring circuitry can be indicated using a single register 48. This allows the number of memory locations which can be monitored by the monitoring circuitry to be extended significantly without a significant increase in circuit area. Moreover, the time taken to test whether an element is part of the set of elements represented by a Bloom filter remains constant, no matter how many elements are in the set. Therefore, identifying the second set of addresses using a Bloom filter 46 also saves processing time.

In some examples, the register 48 is one of an existing set of registers accessible to the processing circuitry, which reduces the circuit area required to implement the present technique even further.

In the examples described so far, the first set of memory locations and the second set of memory locations to be monitored by the monitoring circuitry are identified using their associated memory addresses—for example, the address storage circuitry 20 and the cache 24 store addresses of the first and second sets of memory locations, and addresses of the second set of memory locations are the input values merged into the Bloom are be identified in a different format.

Figure 5A:
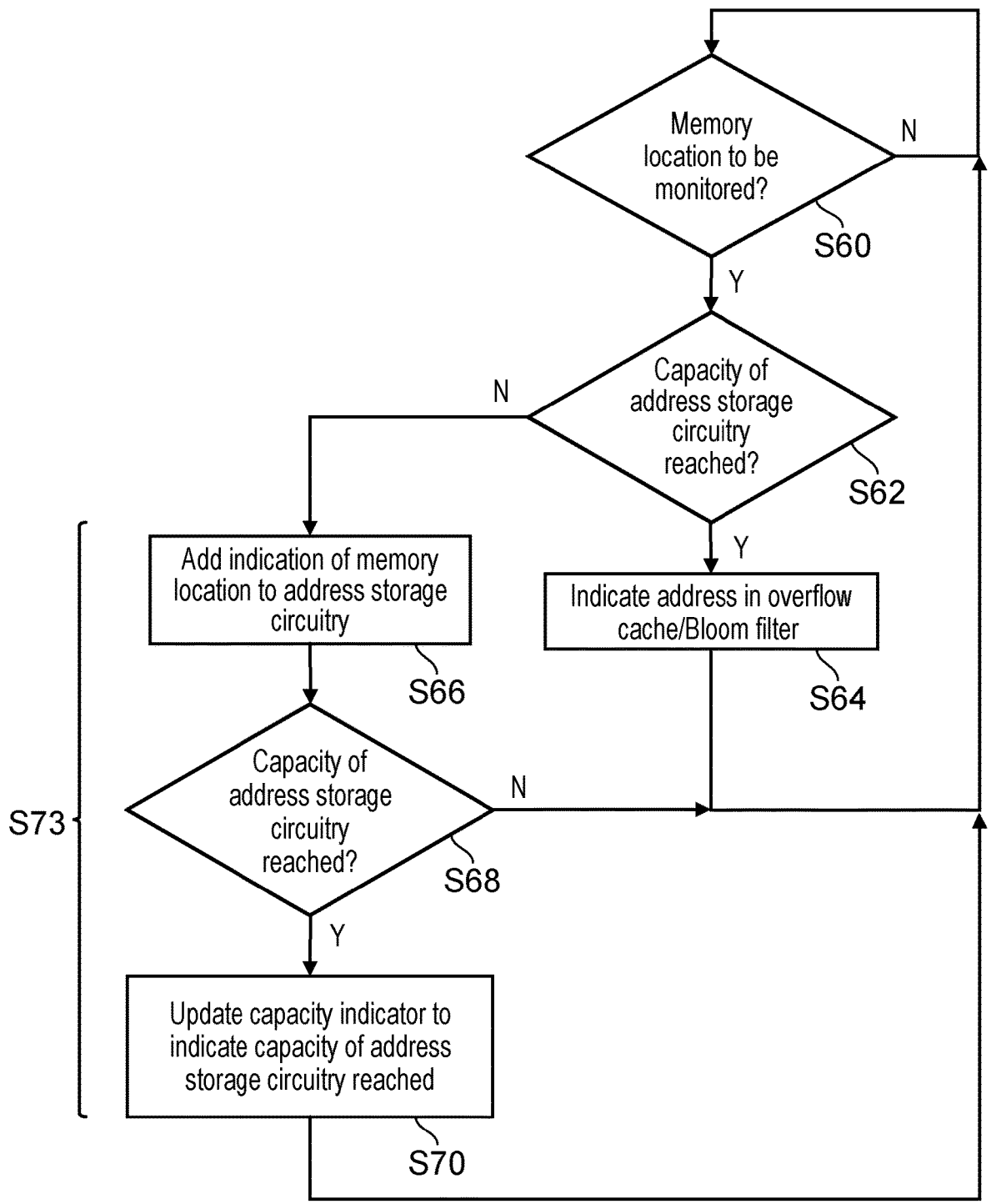
FIG. 5A is a flow diagram illustrating the response of the processing circuitry to a monitor-address instruction.

FIG. 5A is a flow diagram illustrating an example of a response of the processing circuitry of the present technique to a monitor-address instruction.

The method begins with a step S60 of determining whether a new memory location is to be monitored by the monitoring circuitry. For example, the processing circuitry determines whether a monitor-address instruction has been received. When the processing circuitry determines that a new memory location is to be monitored, it determines S62 whether the capacity of the address storage circuitry has been reached. For example, the processing circuitry checks whether the capacity indicator is set to a predetermined value. If the capacity has been reached, the processing circuitry indicates S64 the new memory location in a cache or Bloom filter, according to the examples described above, before returning to step S60.

On the other hand, if the capacity of the address storage circuitry has not been reached, the processing circuitry adds S66 an indication of the new memory location (e.g. an address) to the address storage circuitry. The processing circuitry then checks S68 whether the capacity of the address storage circuitry has now been reached, following the addition of the new memory location. If the capacity of the address storage circuitry has not been reached, the method returns to S60. On the other hand, if the capacity has now been reached, the processing circuitry updates S70 the capacity indicator to indicate that the capacity of the address storage circuitry has been reached, before returning to step S60. Collectively, steps S66, S68 and S70 form a step S73 of updating the address storage circuitry.

Figure 5B:
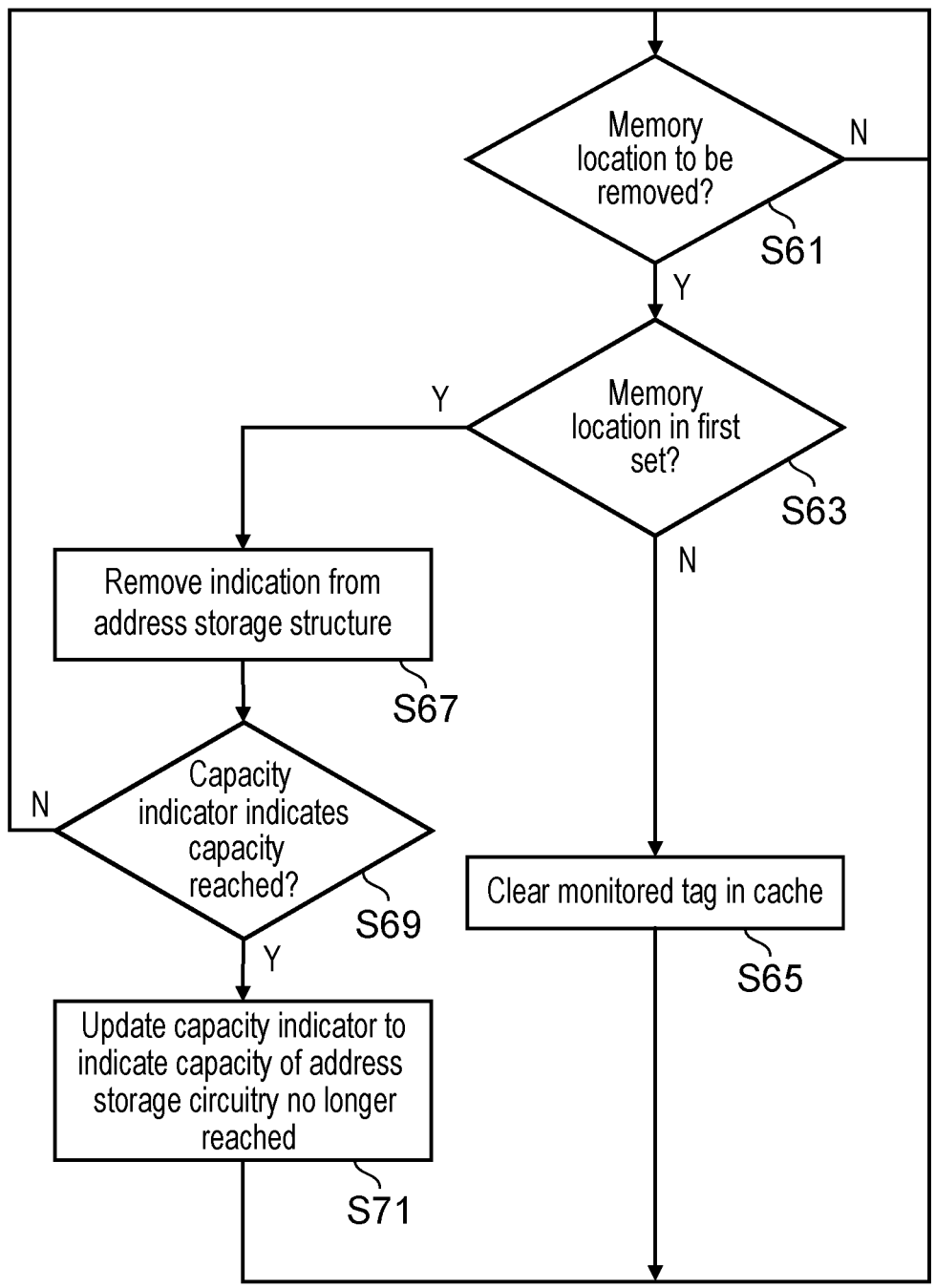
FIG. 5B is a flow diagram illustrating the removal of a memory location from the first or second set of memory locations.

FIG. 5B is a flow diagram illustrating the removal of a memory location from the first or second set of memory locations. This could be in response to a specific end-monitoring instruction specifying a memory location which is no longer to be monitored, for example. In this example, the second set of memory addresses is indicated in a cache.

The method begins with a step S61 of determining whether a memory location is to be removed from the first set of memory locations or the second set of memory locations. When it is determined that a memory location is to be removed, it is determined S63 whether the memory location in question is in the first set of memory locations (indicated in the address storage circuitry) or in the second set of memory locations (indicated in the further storage circuitry). When the memory location is indicated in the first set, the memory location is removed S67 from the address storage circuitry. It is then determined S69 whether the capacity indicator indicates that the capacity of the address storage structure is reached. If the capacity indicator does not indicate that the capacity is reached, the method returns to step S61; if the capacity indicator indicates that the capacity is reached, the capacity indicator is updated S71 to indicate that the capacity of the address storage circuitry is no longer reached (due to the removal of a memory location from the address storage circuitry), and the method returns to step S61.

Returning to step S63, if it is determined that the memory location is not in the first set (e.g. it is in the second set), the monitored tag in the cache line corresponding to the memory location to be removed is cleared S65, before the method returns to step S61. As noted above, this example assumes that the second set of memory locations is indicated in a cache. If the second set is instead indicated in a Bloom filter, the method returns straight to step S61 when it is determined that the memory location is in the second set, since an entry cannot be removed from a Bloom filter. In this case, a false positive result will be returned any time the memory location is tested against the Bloom filter.

Figure 6:
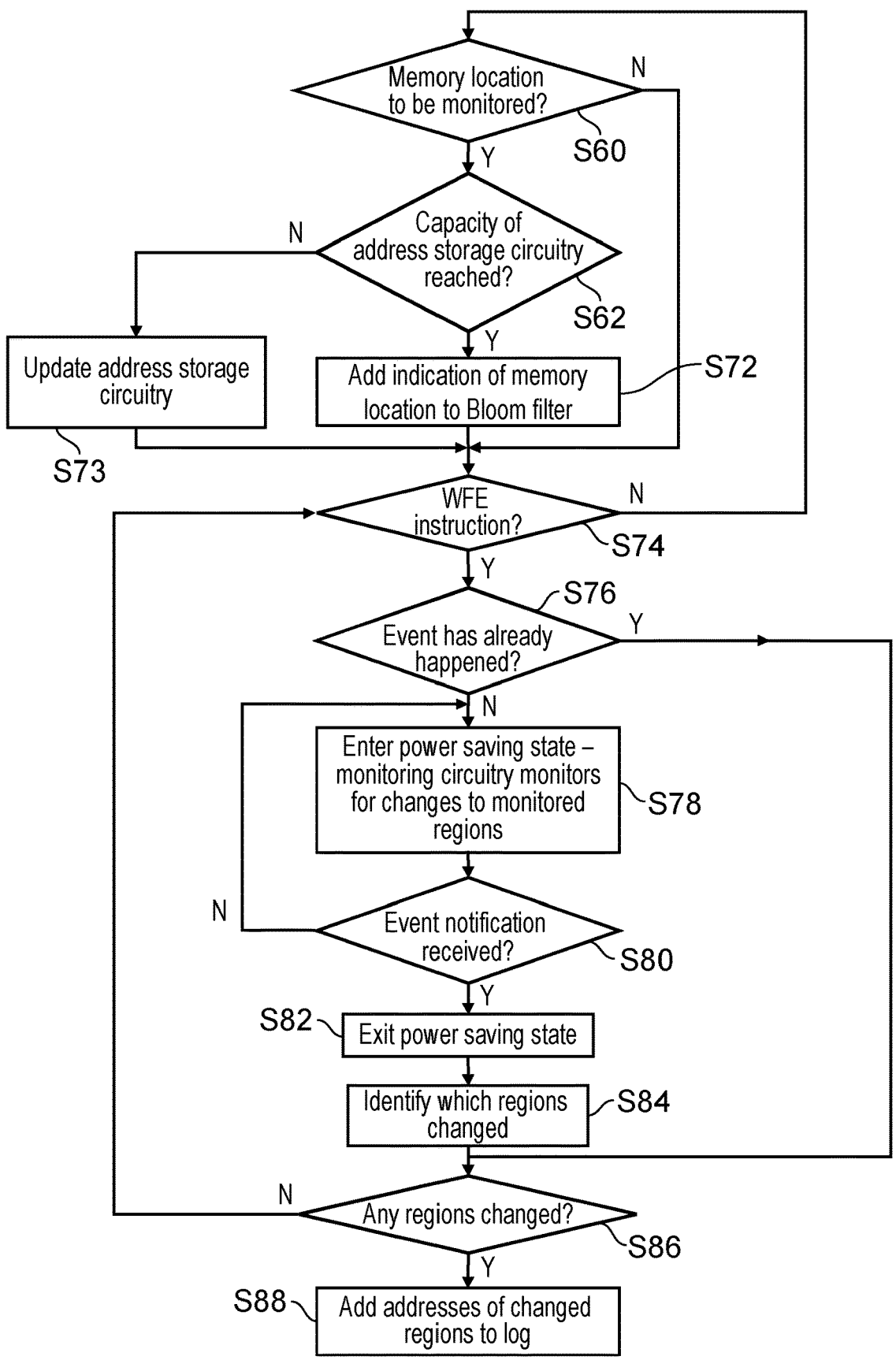
FIG. 6 is a flow diagram illustrating the response of the processing circuitry to a monitor-address instruction in examples using a Bloom filter.

FIG. 6 is a flow diagram illustrating a method carried out by the processing circuitry in accordance with some examples of the present technique. The method begins with a step S60 of determining whether a new memory location is to be monitored by the monitoring circuitry. If the processing circuitry determines that there is no new memory location to be monitored (e.g. if no monitor-address instruction is received), the method proceeds directly to a step S74 of determining whether a wait-for-event (WFE) instruction has been received.

On the other hand, if the processing circuitry determines that there is a new memory location to be monitored (e.g. a monitor-address instruction is received), the processing circuitry determines S62 whether the capacity of the address storage circuitry has been reached (e.g. by checking whether the capacity indicator has a predetermined value). If the capacity has not been reached, the processing circuitry updates S73 the address storage circuitry, before continuing to step S74. It will be appreciated that although the steps S668, S68 and S70 are not shown explicitly in FIGS. 6 and 7, these steps will all be present as part of step S73. On the other hand, if the capacity of the address storage circuitry has been reached, the processing circuitry instead merges S72 an indication of the new memory location into a Bloom filter, before proceeding to step S74.

In step S74, the processing circuitry determines whether a WFE instruction has been received. If no WFE instruction has been received, the method returns to step S60. On the other hand, if a WFE instruction has been received, the processing circuitry executes the WFE instruction by determining S76 whether an event (e.g. data at one of the memory locations being monitored by the monitoring circuitry being changed) has already occurred. If an event has already occurred, the method moves to step S84.

If an event has not yet occurred, the processing circuitry enters S78 a power saving mode (e.g. low-power state or standby state) while the monitoring circuitry continues to monitor the first and second sets of memory locations. The processing circuitry remains in a power saving mode until it determines S80 that an event notification has been received. The event notification in this example includes an indication, generated by the monitoring circuitry, that data at one of the memory locations being monitored by the monitoring circuitry has been modified, which could mean that a message from another processing circuitry has been written to the memory location, for example. The processing circuitry repeats steps S78 and S80 until an event notification is received.

When an event notification has been received, the processing circuitry exits S82 the power saving state. In step S84, the processing circuitry then identifies which, if any, memory regions have been modified. The processing circuitry determines S86 whether any memory regions have been modified and, if no regions have been modified, returns to step S74. On the other hand, if one or more memory regions have been changed, the processing circuitry adds S88 the addresses of the changed memory locations to a log of addresses to be processed by the processing circuitry.

Figure 7:
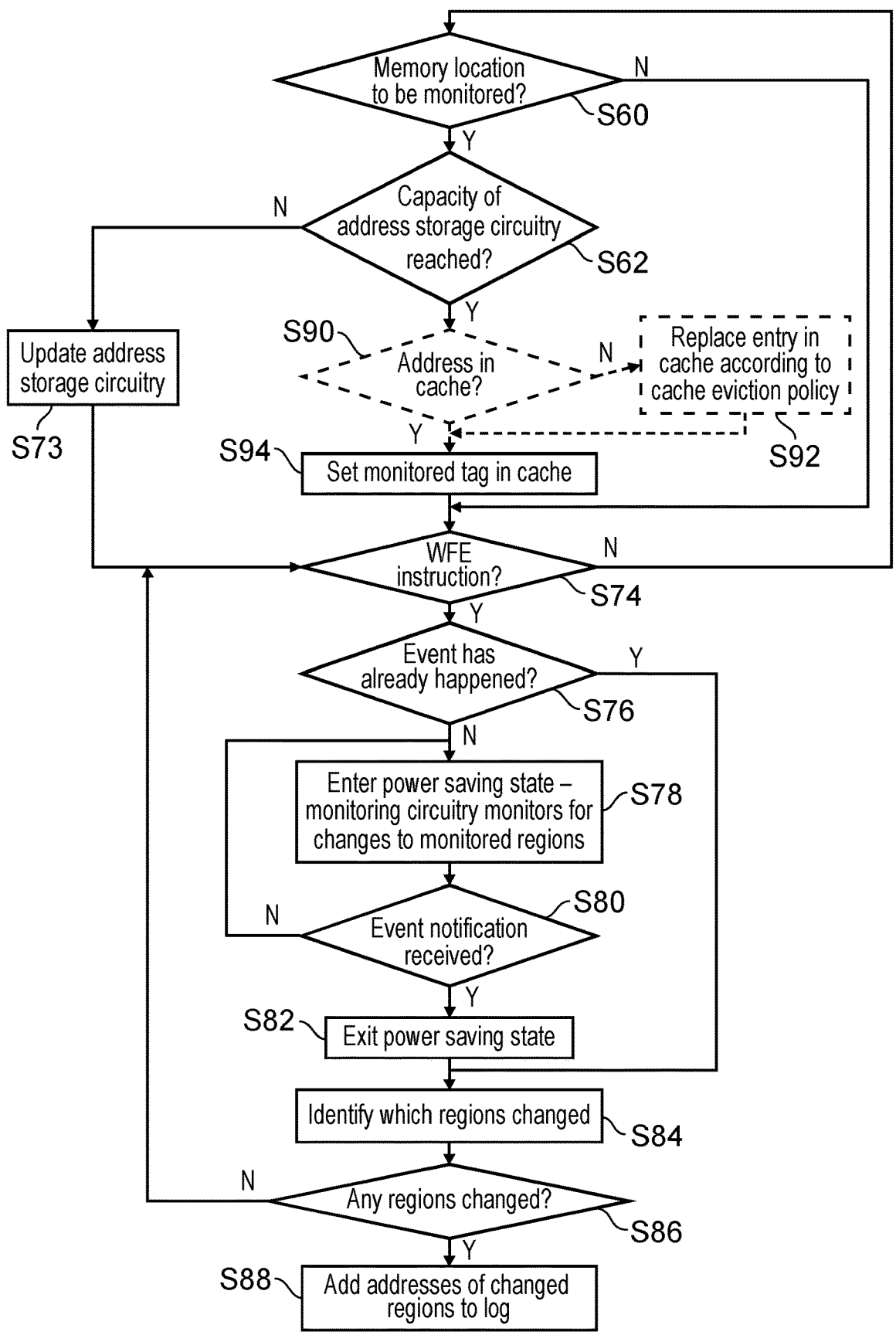
FIG. 7 is a flow diagram illustrating the response of the processing circuitry to a monitor-address instruction in examples using a cache.

FIG. 7 is a flow diagram illustrating an alternative method carried out by the processing circuitry. The method of FIG. 7 is identical to the method of FIG. 6, except that when the processing circuitry determines S62 that the capacity of the storage circuitry has been reached, the processing circuitry tags S94 the memory location as monitored in the cache (e.g. by setting the monitored field in the cache to a predetermined value). Optionally—as shown in dashed lines—the processing circuitry can first check S90 whether the memory location is recorded in the cache and, if it is not, replace S92 an entry in the cache according to the normal cache eviction policy. However, these steps are optional because it is expected that the memory location will be present in the cache—the processing circuitry is likely to have accessed the memory location in response to receiving the monitor-address instruction, at which point the memory location would be added to the cache. Therefore, these steps do not need to be included in a system which automatically adds an address specified by an instruction to the cache.

Figure 8:
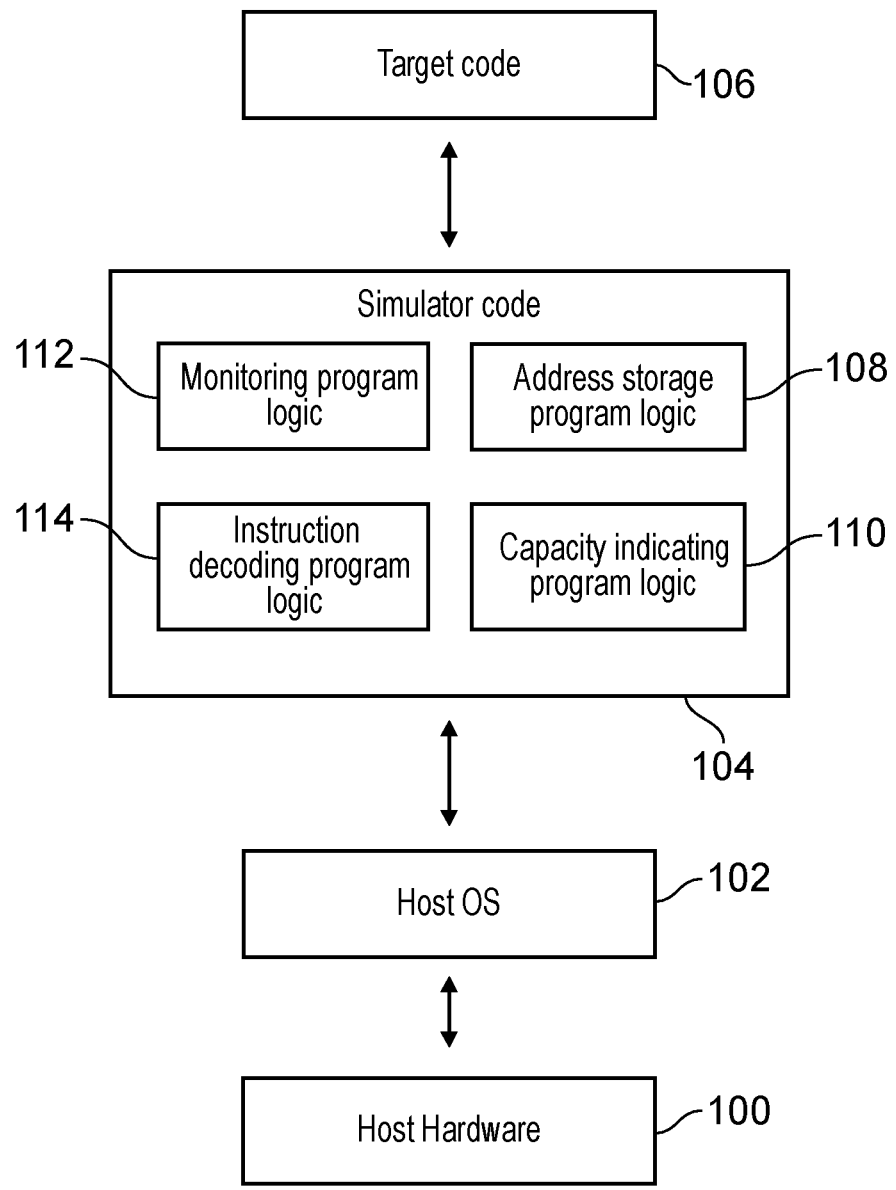
FIG. 8 illustrates a virtual machine implementation of the present technique.

FIG. 8 illustrates a simulator implementation of the present technique. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation runs on a host processor 100, optionally running a host operating system 102, supporting the simulator program 104. In some arrangements, there are multiple layers of simulation between the hardware and the provided instruction execution environment, and/or multiple distinct instruction execution environments provided on the same host processor. Historically, powerful processors have been required to provide simulator implementations which execute at a reasonable speed, but such an approach is justified in certain circumstances, such as when there is a desire to run code native to another processor for compatibility or re-use reasons. For example, the simulator implementation can provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality is provided by suitable software constructs or features. For example, particular circuitry can be implemented in a simulated embodiment as computer program logic. Similarly, memory hardware, such as a register or cache, can be implemented in a simulated embodiment as a software data structure. In the example of FIG. 8, these include address storage program logic 108 to maintain a data structure (within the memory or registers of the host apparatus 100) which represents (emulates) the address storage circuitry described in the above examples, capacity indicating program 110 logic to maintain a capacity indicator as described in the above examples, monitoring program logic 112 to emulate the monitoring circuitry described in the above examples, and instruction decoding program logic 114 to emulate an instruction decoder of the processing circuitry described above. In arrangements where one or more of the hardware elements referenced in the previously described embodiments are present on the host hardware (for example, host processor 100), some simulated embodiments can make use of the host hardware, where suitable. For example, host processor 130 could contain in hardware caches that perform the function of the caches 12 and 13 of FIG. 1 and/or the cache 24 of FIGS. 2 and 3. The simulator code 104 can also include register emulating logic (not shown) to maintain a data structure (within the memory or registers of the host apparatus 100) which represents the registers of the system 2. In some examples, this includes the register 48 storing the Bloom filter 46 described in some examples above.

In response to a monitor-address instruction of the target code 106, the instruction decoding program logic 114 maps the monitor-address instruction to a set of instructions in the instruction set to check the capacity indicator, emulated by the capacity indicating program logic 110, to determine whether the capacity of the emulated address storage circuitry has been reached. When the capacity has not been reached, an indication of the new memory location specified by the monitor address instruction is added to the data structure maintained by the address storage program logic 108, while if the capacity has been reached, the new memory location is indicated in a cache (e.g. a cache of the host hardware 100 or in a data structure maintained in memory or in the registers of the host processor 100) or in a Bloom filter stored in a data structure maintained by register emulating logic.

In some examples, the simulator program 104 is stored on a computer-readable storage medium (e.g. a non-transitory medium), and provides a program interface (instruction execution environment) to the target code 106 (which could include applications, operating systems and a hypervisor) which is the same as the interface of the hardware architecture being modelled by the simulator program 104. Thus, the program instructions of the target code 106, including the monitor-address instruction and WFE instruction described above, can be executed from within the instruction execution environment using the simulator program 102, so that a host computer 100 which does not actually have the hardware features of the apparatus 2 discussed above can emulate these features.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the operation. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   address storage circuitry configured to store indications of a first set of memory locations of a shared memory;
   a capacity indicator configured to indicate whether a capacity of the address storage circuitry has been reached;
   monitoring circuitry configured to monitor the first set of memory locations and a second set of memory locations of the shared memory, identified in further storage circuitry, to identify whether data stored at either the first set of memory locations or in the second set of memory locations has been modified, wherein the monitoring circuitry is responsive to determining that the data has been modified to generate an indication that the data has been modified; and
   processing circuitry configured to receive the indication that the data has been modified and to execute a monitor-address instruction that specifies an address of a new memory location in the shared memory to:
      determine, based on the capacity indicator, whether the capacity of the address storage circuitry has been reached;
      in response to determining that the capacity of the address storage circuitry has not been reached, update the address storage circuitry to indicate that the new memory location is to be monitored by the monitoring circuitry; and
      in response to determining that the capacity of the address storage circuitry has been reached, update the further storage circuitry to indicate that the new memory location is to be monitored by the monitoring circuitry;
   wherein the processing circuitry is configured to support instructions in an instruction set architecture and the instructions include the monitor-address instruction.

2. The apparatus of claim 1, wherein:
   the address storage circuitry comprises a plurality of entries, each configured to store one of the indications of the first set of memory locations; and
   the capacity indicator is configured to indicate that the capacity of the address storage circuitry has been reached unless the plurality of entries comprises at least one available entry for storing an indication of the new memory location.

3. The apparatus of claim 1, wherein:
   the capacity indicator indicates whether the capacity of the address storage circuitry has been reached based on a value stored in the address storage circuitry.

4. The apparatus of claim 1, wherein:
   the monitoring circuitry is configured to identify that the data has been modified in response to receiving a snoop request identifying a memory location in the first set or the second set.

5. The apparatus of claim 1, wherein:
   the further storage circuitry is configured to store the indications of the second set of memory locations in a different format to the indications of the first set of memory locations stored in the address storage circuitry.

6. The apparatus of any claim 1, wherein:
   the further storage circuitry comprises a cache.

7. The apparatus of claim 6, wherein:
   the cache comprises a plurality of entries indicating the second set of memory locations, wherein each of the entries is associated with a tag; and
   during execution of the monitor-address instruction, the processing circuitry is configured to update the cache to indicate that the new memory location is to be monitored by setting the tag associated with a new entry indicating the new memory location to a predetermined value.

8. The apparatus of claim 7, wherein:
   the tag is stored in a transactional memory field configured to indicate whether a cached memory location associated with the tag has been accessed by the processing circuitry during execution of a current transaction or will be accessed by the processing circuitry upon completion of execution of the current transaction.

9. The apparatus of claim 7, wherein:
   the monitoring circuitry is responsive to a snoop request identifying a given memory location to identify that the data has been modified based on whether the given memory location is indicated in the address storage circuitry as being in the first set of memory locations or tagged in the cache as being in the second set of memory locations.

10. The apparatus of claim 1, wherein:
    the further storage circuitry comprises a register.

11. The apparatus of claim 10, wherein:
    the register is configured to store a Bloom filter identifying the second set of memory locations.

12. The apparatus of claim 11, wherein:
    the Bloom filter comprises a bit array; and
    during execution of the monitor-address instruction, the processing circuitry is responsive to determining that the capacity of the address storage circuitry has been reached to:
       apply at least one hash function to an indication of the new memory location to identify a plurality of bit positions in the Bloom filter; and
       set each of the plurality of bit positions to a predetermined value.

13. The apparatus of claim 11, wherein:
    the monitoring circuitry is responsive to a snoop request identifying a given memory location to determine that the data has been modified in response to at least one of:
    determining that the first set of memory locations includes the given memory location when an indication of the given memory location matches an indication stored in the address storage circuitry; and
    determining that the second set of memory locations may include the given memory location based on testing the indication of the given memory location against the Bloom filter.

14. The apparatus of claim 1, wherein:
    the monitoring circuitry is separate from the processing circuitry.

15. The apparatus of claim 14, wherein:
    the processing circuitry is responsive to a wait-for-event instruction to enter a low-power state until an event indication is received by the processing circuitry.

16. The apparatus of claim 15, wherein:
    the event indication comprises the indication that the data has been modified.

17. The apparatus of claim 1, wherein:
    the first and second sets of memory locations comprise memory locations to which other sets of processing circuitry can write messages to be read by the processing circuitry.

18. The apparatus of claim 1, wherein:
during execution of the monitor-address instruction, following updating the address storage circuitry to indicate that the new memory location is to be monitored by the monitoring circuitry, the processing circuitry is configured to check whether the capacity of the address storage circuitry has now been reached; and
in response to determining that the capacity of the address storage circuitry has now been reached, the processing circuitry is configured to update the capacity indicator to indicate that the capacity of the address storage circuitry has been reached.

19. A method comprising:
storing indications of a first set of memory locations of a shared memory in address storage circuitry;
providing a capacity indicator to indicate whether a capacity of the address storage circuitry has been reached;
monitoring the first set of memory locations and a second set of memory locations of the shared memory, identified in further storage circuitry, to identify whether data stored at either the first set of memory locations or the second set of memory locations has been modified;
in response to determining that the data has been modified, generating an indication that the data has been modified;
receiving at processing circuitry the indication that the data has been modified; and
executing a monitor-address instruction that specifies an address of a new memory location in the shared memory to:
  determine, based on the capacity indicator, whether the capacity of the address storage circuitry has been reached;
  in response to determining that the capacity of the address storage circuitry has not been reached, update the address storage circuitry to indicate that the new memory location is to be monitored by the monitoring circuitry; and
  in response to determining that the capacity of the address storage circuitry has been reached, update the further storage circuitry to indicate that the new memory location is to be monitored;
wherein the processing circuitry supports instructions in an instruction set architecture and the instructions include the monitor-address instruction.

20. A computer program to control a host data processing apparatus to provide an instruction execution environment for execution of target code, the computer program comprising:
address storage program logic to maintain an address storage structure in a memory or in registers of the host data processing apparatus to store indications of a first set of memory locations of a shared memory;
capacity indicating program logic to maintain a capacity indicator in the memory or the registers to indicate whether a capacity of the address storage structure has been reached;
monitoring program logic to monitor the first set of memory locations and a second set of memory locations of the shared memory, identified in a further storage structure maintained in the memory or the registers, to identify whether data stored at either the first set of memory locations or the second set of memory locations has been modified, wherein the monitoring program logic is responsive to determining that the data has been modified to generate an indication that the data has been modified; and
instruction decoding program logic to decode instructions of the target code to control the host data processing apparatus to perform data processing;
wherein the instruction decoding program logic is responsive to a monitor-address instruction that specifies an address of a new memory location in the shared memory to:
  determine, based on the capacity indicator, whether the capacity of the address storage structure has been reached;
  in response to determining that the capacity of the address storage structure has not been reached, update the address storage structure to indicate that the new memory location is to be monitored by the monitoring logic; and
  in response to determining that the capacity of the address structure circuitry has been reached, update the further storage structure to indicate that the new memory location is to be monitored by the monitoring logic;
wherein the instruction decoding program logic supports instructions in an instruction set architecture and the instructions include the monitor-address instruction.

\* \* \* \* \*